United States Patent [19]
Ouaknine et al.

[11] Patent Number: 6,091,422
[45] Date of Patent: Jul. 18, 2000

[54] SYSTEM FOR EDITING COMPLEX VISUAL DATA PROVIDING A CONTINUOUSLY UPDATED RENDERING

[75] Inventors: Alain Ouaknine, Cote St. Luc; Alexis Smirnov, Montreal, both of Canada; Jean-Marc Krattli, Paris, France

[73] Assignee: Avid Technology, Inc., Tewksbury, Mass.

[21] Appl. No.: 09/096,187

[22] Filed: Jun. 12, 1998

Related U.S. Application Data

[60] Provisional application No. 60/080,583, Apr. 3, 1998.

[51] Int. Cl.[7] ........................................... G06F 15/00
[52] U.S. Cl. .................................................. 345/419
[58] Field of Search .................... 345/419, 425, 345/426, 427, 441, 442, 473, 474

[56] References Cited

U.S. PATENT DOCUMENTS

| | | | |
|---|---|---|---|
| 5,307,449 | 4/1994 | Kelley et al. | 345/419 |
| 5,557,711 | 9/1996 | Malzbender | 345/422 |
| 5,761,401 | 6/1998 | Kobayashi et al. | 345/430 |

*Primary Examiner*—Phu K. Nguyen
*Attorney, Agent, or Firm*—Lawrence E. Monks; Kenneth L. Milik

[57] ABSTRACT

An authoring system provides a realistic rendering that may be updated and displayed continuously while simultaneously allowing full access to all authoring tools. The system is an enhancement to an authoring environment for 3D modeling. The rendering is incorporated in the authoring environment in a way that avoids conflicting with the abstract images and tools useful for working with 3D models such as would obtain in a WYSIWYG implementation. The computational burden of rendering is handled by rendering in an asynchronous parallel thread with respect to that supporting the authoring UI. The number of pixels that must be ray-traced is reduced by several mechanisms including: limiting the number of objects, limiting the resolution of the display, tailoring the size of the field-of-view window (while providing orientation context by placing the rendering on top of a wire-frame view). Also, only portions of the scene that are affected in a visible way by updates are re-rendered. The rendering fits into the authoring context by forming it in a selectable-size region in a wire-frame or other type of view. Also, the authoring UI thread is executed at a higher priority than the rendering thread (or some other control means) to insure the UI is not slowed down. The rendering is placed on top of a wire frame so that it fits into and takes advantage of the wire-frame view without interfering with it substantially. The rendering window can be tailored to show precisely the part of the scene the author is working on.

85 Claims, 6 Drawing Sheets

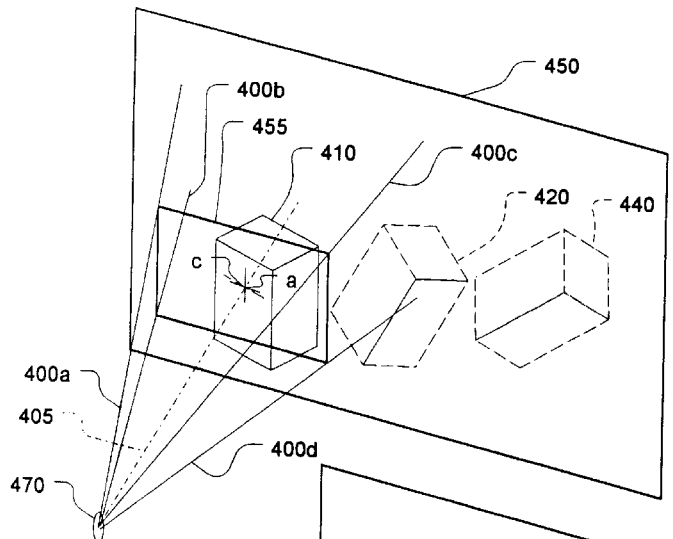
Fig. 7a
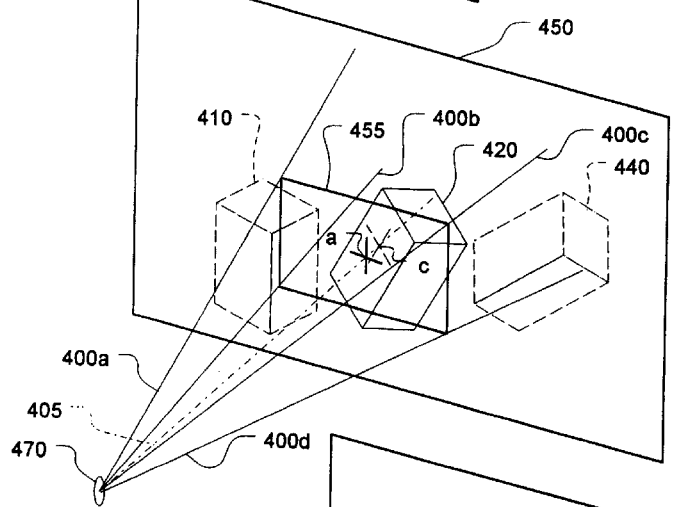
Fig. 7b
Fig. 7c
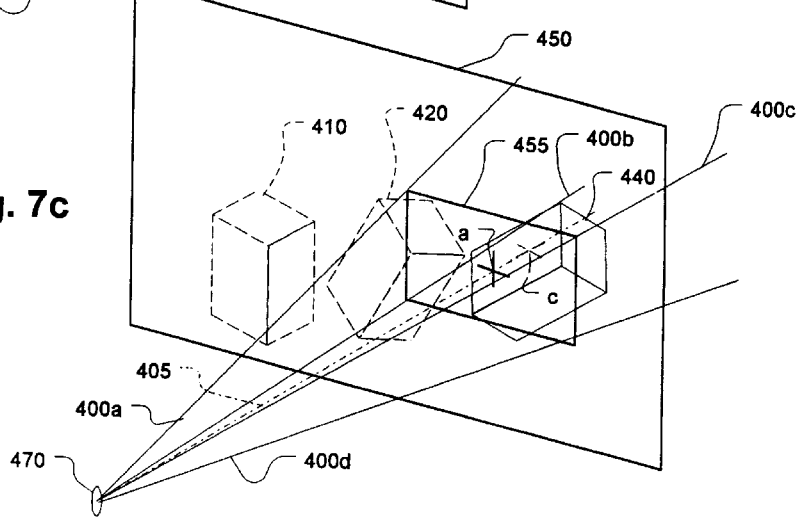

SYSTEM FOR EDITING COMPLEX VISUAL DATA PROVIDING A CONTINUOUSLY UPDATED RENDERING

This application claims priority to application Ser. No. 60/080,583 filed Apr. 3, 1998.

FIELD OF THE INVENTION

The invention relates to systems for the production of rendered 2D images derived from 3D scene data using computers. More particularly, it relates to systems that generate an authoring environment that permits users to update the 3D scene data while simultaneously displaying a continuously updated realistic rendering of the 3D scene.

BACKGROUND

Modern computer graphics, the kind often seen in movies and computer-generated artwork, consist of two-dimensional (2D) images or image sequences (movies) that are derived from complex 3D data. The 3D scene data includes the 3D coordinates of every object in a scene. Since the images derived from the scene are intended to show a realistic representation of actual 3D objects, the scene data also includes definitions, called "shaders," that represent surface and volume properties of each object. The shaders dictate how light is reflected, refracted, and scattered by the objects. Shaders can also be defined for volumes of space (e.g., a puff of smoke) or the entire scene environment, the latter being called an environmental shader.

To make the realistic image, the 3D scenes are rendered. The process of rendering involves ray-tracing which determines the look of each pixel visible from the camera viewpoint. In ray-tracing, the effects of occultation and diffuse and specular reflection, refraction, and diffusion of light by the various objects and volumes in the scene are determined. Ray tracing not only accounts for primary effects which are the reflections, refractions, and diffusions of light arriving directly from the light sources, but also for secondary reflections. The latter result when primary light from other objects illuminates, or passes through, an object or volume. These secondary effects can involve multiple reflections, refractions, or transmissions between the original light source and the camera so that, considering that rays must be traced for every pixel in a scene, and considering that some shaders involve complex numerical algorithms, the process of rendering can be extremely time consuming for current computer technology.

Referring to FIG. 1, when an author creates and edits a 3D scene the author edits the scene data that defines 3D objects. Typically, the feedback provided to the author is an unrealistic wire-frame view of the scene. A typical editing environment may show (on a display screen 10) a perspective wire-frame view 40 in a separate window. Other wire-frame views may also be shown, for example a top view 60. The wire frame views 40, 60 show objects as they appear in perspective 30, 50 or as the objects appear in a top view. Also forming part of the editing environment are various tools used to define the shaders and other properties in the scene. For example, an object may be selected and a shader editor 20 invoked to define or modify the shaders applied to the selected object. The shader editor has various controls 25 to adjust the various shader properties of the object. The various objects defined in the scene can also be moved and their sizes adjusted, for example, by using control points on the wire-frames. The wire-frame views may also display, and allow editing of, so-called "3D manipulators" which allow editing of non-physical objects and effects that have 3D attributes. For example, the cone of projection of a light source can be resized, moved, or rotated by manipulating a corresponding 3D manipulator.

While working in the above-described authoring (or editing) context, the author can see, in near real time, the effects of some of the changes. For example, when an object's wire-frame is moved, the wire-frame image is updated immediately. To see the rendering effects of the artist's work, however, the artist must request a rendering of the scene data. This changes the context of the user interface to a preview context 70 in which the author is disconnected from the editing tools. Once the author has waited for, and inspected, the rendered image, the author can return to the editing context and access the object manipulators, shader editors, etc. This situation, where the artist is working in one context, the editing context, and seeing the actual image in another context, can be limiting because it does not provide full and immediate feedback to the artist. For example, imagine modeling a dinosaur walking and trying to make subtle adjustments to the skin texture. The author must remember the way the skin looked, tweak some parameter, and inspect the result. Some editing environments allow the author to store multiple images and juxtapose them in a different framework, a picture viewer or editor, for example. However, this slows down the process of editing and takes the author through multiple steps and different environments.

Currently, in 2D drawing- and bitmap-editing programs and word-processors, the developer is able to work in an environment that shows the results of modifications almost immediately. This is the so-called, what-you-see-is-what-you-get (WYSIWYG) feature. At first blush, it might seem desirable to provide this feature for graphic artists and animators working with complex 3D models. However, the rendering process, which is what provides the author with such critical information, is so computationally-intensive, that performance would be unacceptably degraded in a hypothetical WYSIWYG environment, given the limitations of current and near term hardware technology. Waiting for images to be updated would impose delays between each step implemented by the author.

On the other hand, for 3D scenes, conventional authoring environments are superior in some ways to what would be available in a WYSIWYG environment. The wire-frame views and object property-defining tools display abstracted information about the scene that provides, in some cases, more information than a realistic rendering. For example, objects with 3D attributes that are almost invisible in a rendering can be seen clearly in a wireframe view. Also, wire-frame views can show guides that can be helpful in providing perspective. Rendered views often contain little contrast at the boundaries of objects. This is not a problem with wire-frames views. So the idea of bringing WYSIWYG to a 3D editing environment appears not only impractical, it also appears to involve some sacrifices. The invention addresses both of these drawbacks of the prior art.

SUMMARY OF THE INVENTION

A computer 3D modeling and animation system provides a user interface that allows an artist to make changes to 3D scene data while simultaneously allowing the author to view rendered images corresponding to those changes. In effect, it brings certain benefits of a WYSIWYG environment to 3D modeling and animation systems. The described system makes it possible to provide all the editing tools normally associated with a 3D editing context as well as a rendered image that is automatically updated. This is achieved through a combination of devices:

1. The frame of the rendered image is fragmented into portions. When scene modifications are entered, and a stale rendering is resident in memory, only the portions of the rendering that must be re-rendered are submitted to a rendering task that runs in parallel with the support of the user-interface. In an embodiment of the invention, the sub-portions of the rendering are regular adjoining shapes referred to as tiles.

2. The part of the scene for which a rendering is maintained may be precisely defined in various ways according to features and embodiments of the invention. For example, a box may be placed over a wire-frame view to define the precise part of a view of the scene to be rendered. To narrow the subject of rendering further, specific objects may be identified, the remaining objects left unrendered. Thus, the subject of rendering may be tailored to the particular task on which the author is focused.

3. The user-interface continually accepts scene modifications and updates abstracted images, such as wire-frame views, in response to the author's work. This user-interface support activity is performed independently at a high priority and so is not slowed down by the "background" task of updating the rendering. The user-interface may blank stale portions of the rendering until the CPU-time becomes available to complete the rendering. Alternatively, stale features may be overwritten to provide an immediate temporal juxtaposition of the rendering before and after each change. Note that alternatively to prioritizing, in a parallel processor system, the same results can be achieved without prioritizing as in a single-processor system.

4. Before controlling the rendering process in response to scene modifications, the modifications are checked to determine if they would manifest any visible difference in the render region view. The rendering process is not interrupted, nor is indication to the rendering process made, if the changes would not manifest any change in the rendered image within the region.

5. Constituent portions of the rendered image are sequentially re-rendered as a background task until the portions of the render region required to be updated have been re-rendered. As rendering of each portion is completed, the portion is submitted to a render cache and another fast background process, which runs in parallel with the rendering process, paints the tiles in the cache.

7. Storing the rendered tiles in a cache as rendering is completed.

8. Retrieving valid tiles from the cache and refreshing the display by painting the tiles, as they are retrieved, to maintain synchrony between scene updates entered by the user and the displayed rendered image.

9. Aborting rendering of tiles when a user-defined update invalidates those tiles.

10. Emptying or invalidating the cache when a user-defined update invalidates the tiles stored in the cache.

11. Multithreading the above tasks so that the sequence defined by steps [3-4-9-10] or steps [3-4], depending on the substance of the user's input, steps [5-6-7], and step [8] are performed independently (asynchronously).

The invention identifies the following barriers to implementing a full WYSIWYG implementation to the context of a 3D authoring system. (1) The time it takes to render an image is so great, that an authoring system that displayed a realistic image would be impractical because such a system would force the author to wait for the rendering to be updated after each change. (2) At least some of the 3D manipulators required to work with 3D scenes would obscure, or be obscured by, options of a rendered image making it difficult to edit the scene. For example, some authoring systems provide for a limited rendering (at least more realistic than a wire-frame but without the computationally intensive ray tracing associated with the term, rendering) with 3D manipulators and control points. Moreover, the prior art does not strongly motivate a WYSIWYG context because 3D editing is a very abstract process. Many of the things an author is concerned with are invisible objects that alter light directed to a viewer's eye. For example, surface textures, volume shaders (shaders modifying the transmission, scattering, and reflection of light passing through a space for example as used to represent fog or rain), etc. can better be represented in an abstracted view of the scene, like the wire frame or the control panel, rather than in a rendering. Thus, in 3D authoring, the rendering corresponding to WYSIWYG, is viewed as separate from the process of authoring and, therefore, ordinarily comfortably outside the editing environment.

The invention creates an editing environment that provides a rendered view without interfering with editing. That is, it provides full access to the editing tools normally associated with the editing environment. The editing environment still provides and maintains the abstracted views, 3D manipulators, and control points that are helpful for working with 3D scenes. Importantly, access to the editing tools is not hindered by the need to wait for completion of the rendering process. Also, importantly, the rendering process, as implemented in the authoring context, permits the process to proceed more quickly than conventional rendering process by defining and implementing certain shortcuts that have been identified as compatible with the authoring context. Moreover, the rendering made available in the authoring context requires no extra step or context-change and is fully automatic.

The above features are made possible through a number of devices, some of which may be used and some of which may not, while still providing at least a subset of the features of the invention. First, the editing environment allows the author to specify and update a particular region of the scene to be rendered. This region would, for example, correspond to the particular part of the scene the author is working on. Rendering is performed automatically, continuously, and asynchronously relative to the processes of updating the editing views (for example, a wire frame), the accepting of editing data, etc., as described below. Thus, the particular region always shows a rendered view that corresponds to the author's current edits (to the extent the rendering process is able to keep up with the author). The region may be defined, in a preferred embodiment, as a window that can be resized and repositioned directly over a wire-frame perspective view. Alternatively the region can be the area of the field of view subtended by the silhouette of an object. In this case, the object can be selected and only the object's dimensional data, not its background, used to define the region.

The rendered region may be displayed, for example, overlaying a redundant perspective wire-frame view. This allows the author to compare and correlate, with the rendered view, the information displayed in the wire-frame view. In fact, defining the region as a subportion of; and directly overlaying, a wire-frame view, allows the author to obtain a perspective about the rendered view that may not be as easy to obtain in a full rendering. That is, suppose for example the color-difference or contrast, between background and foreground objects in a scene, is fairly low and suppose these objects extend partly into and partly outside the render region. The wire-frame image of such objects appears clearly and in high contrast (along with any control points and non-visible components, such as an artificial cone of projection of a light source). The adjacency of the wire-frame and rendered image of the same objects can enhance the author's orientation and his ability to correlate what the author sees in the rendered image and what the author sees in the wire-frame image.

Note that the presence of the rendered view in the render region, as described above, does not interfere in any way with the author's access to the editing tools used in the editing context. The author can access any of the editing tools normally associated with the editing context while simultaneously seeing the rendered region. Also, the context still provides and maintains the abstracted views, 3D manipulators, and control points that are helpful for working with 3D scenes. In fact, these same abstracted views are enhanced by the juxtaposition of a rendered image with the abstracted image. That is, by placing the rendered image next to a corresponding wire-frame image, for example, the author can easily see the effect of scene modifications in the realistic image. Moreover, each time a change is made, say a minor adjustment in color for example, the author can see the unedited scene (or subject) change, as a result of the scene modification, while viewing the region. That is, the author may see the old and new renderings in temporal juxtaposition. This is very conducive to making fine adjustments.

The invention makes the process of updating the render region asynchronous with respect to the other editing processes, for example, the refreshing of the wire-frame views and the entry of scene modifications. The normal editing environment processes may thus be given priority over the refreshing of the render region. Moreover, the refreshing of the region can occur more quickly than conventional rendering because the rendering is restricted to the small-area region of immediate concern to the author.

In a preferred embodiment, the speed of updating the rendering is increased further by identifying and re-rendering only portions of the region that require it. For example, if changes are made to the texture of a surface of an object, only the parts of the region corresponding to the object's primary and secondary rays need to be rendered again. Other parts of the region may be left as is. The invention also provides, as a further feature, for the use of certain shortcuts, for example, allowing the author to selectively specify that all light sources are point-source lights rather than area lights. This can speed up rendering substantially. This may be implemented as a modifiable default property.

The rendering made available in the authoring context requires no extra step or context-change and is fully automatic. The render region is always on the editing screen, when desired. There is no need to request a rendering. Also, there is no need to change context from a context where the editing tools are accessible, to one where the editing tools are unavailable.

The following is an example and is not intended to represent the only way of implementing the functional features discussed above and elsewhere in the current specification. In this particular embodiment, the view of which the render region is a part, is broken into tiles. The render region's boundaries may or may not cut across the boundaries of a tile. It is expected, however, that when sized to be a substantial proportion of the entire wire-frame view it overlays, the render region boundaries will cut across many tiles. Thus, the render region may contain multiple tiles and fractions of multiple tiles. In the embodiment, the following objects may be defined:

User-Interface: This object provides for the on-going acceptance of the author's scene modifications. The user-interface responds conventionally in the sense that it supports all functions conventionally connected with the authoring environment. The only departures from convention are: making available to a render manager object, scene changes responsive to the author's editing work and providing for the invocation, repositioning, and resizing of the render region window.

Render Manager: This object is responsible for receiving scene modifications and determining if they are of a type that may require render region update (such as a change in a surface texture of an object) or a change that is not displayable, for example, the name of an object or its grouping with other objects. The render manager is also responsible for starting and stopping the render engine. This function keeps the rendering process from interfering with the conventional aspects of maintaining the user-interface. So, for example, rendering may be halted when the wire-frame is being refreshed after repositioning. In other words, the creation, termination, and synchronization of the render thread (the rendering process, as described below) are handled by the render manager so as to prevent blocking of the editing user-interface. The render manager also passes user-entered scene modifications to the render engine. The render manager also determines if scene modifications require a global re-rendering of the entire render region, such as when an environmental shader is edited. In this case the render manager will issue commands to the render engine to abort rendering of tiles and to empty the render cache. The command to empty the cache is passed on with high priority to the render cache so that it is executed without delay. The effect of emptying the render cache is that any non-displayed tiles will be flushed and the render region will show only what was displayed prior to the command.

Render Engine: This object receives instructions to start and stop rendering from the render manager. Scene data are obtained from a scene manager which is a central store of scene data. Updates from user-input are supplied to the render engine through the render manager. The render engine can then determine what parts of the render region must be refreshed and perform the required rendering. In a particular embodiment, the image area is broken into tiles, some or portions of which may be subtended by the render region. The render engine, in that case, may determine from the dimensions (coordinates) of the tiles, the particular scene modifications that are still current, and from the other scene data, the particular tiles that must be re-rendered. The render engine may also reconcile sequences of late-arriving scene modifications that are received before rendering of tiles corresponding to earlier-arriving scene modifications. For example, after a user enters a first scene modification, the render engine may still be rendering the appropriate tiles to implement the first scene modification when a second scene modification is entered. The second scene modification will be incorporated in rendering any tiles destined for re-rendering in response to the first scene modification. The render engine may abort on-going rendering in response to a command from render manager. The render engine continuously supplies rendered tiles to the render cache as the tiles are rendered.

Render Cache: This object stores tiles coming from the render engine. The render cache must also dispose of obsoleted tiles stored therein according to instructions from the render engine. The render cache also supplies tiles to the render view object. The contents of the render cache are what is visible in the render region.

Render View: This object receives, stores, and implements commands specifying the size and location of the render region. This render region definition data is also made available to the render engine which may use it to determine the tiles to be rendered. The render view object also stores rendering options, for example, rendering sampling, speed. This object may also generate requests for a new rendering of certain tiles when the render region is redefined. The latter function may also be handled by the render manager. Region definition data may be supplied to the render engine (so, for example, it may determine which tiles need to be updated by scene modifications or region re-definition). Finally, the render view object is responsible retrieving tiles from the render cache and for painting the region in response to the reception of newly rendered tiles.

According to an embodiment, the invention provides an authoring system for editing three-dimensional scenes. The invention is implementable on a general purpose computer by programming it as follows. First and second synchronous threads are defined. The first thread is a user-data-accepting thread that provides some sort of feedback whenever changes to a three-dimensional scene are entered by the user. The user may also enter data defining how the scene is displayed, such as the orientation of the camera used to form a particular wire-frame view. The first thread maintains the three-dimensional scene (updating it according to user inputs) and displays at least an abstract rendering, such as a wire-frame view. In the first thread, the entry of data, the updating of the scene, and the updating of the abstracted view are performed as a synchronous process. The second thread is executed in parallel with the first. The second thread maintains a realistic rendering of the three-dimensional scene which may involve ray-tracing. The idea being that the rendering process takes a substantial amount of time and therefore can be controlled to consume less resources so as not to hamper the authoring environment generated by the first thread. The rendered image may or may not be displayed continuously in the authoring environment. The first and second threads are substantially simultaneously executed so that the rendering may be displayed in the context of the authoring environment. The angular point of view of the realistic rendering is maintained substantially identical to the angular point of view of the abstract rendering. Optionally, the realistic rendering is displayed overlying a corresponding area of the abstract rendering, so the abstract rendering provides visual orientation to the realistic rendering. Also, a second abstract rendering substantially identical to the first abstract rendering can be displayed simultaneously. The first and second abstract renderings may be maintained with substantially identical angular orientations with respect to a camera defining a point of view that characterizes the view of the abstract renderings. Preferably the abstract renderings are wire-frame images. To allow the rendering to be updated quickly, the first synchronous thread can include the input of data that identifies particular objects to be realistically rendered in the realistic rendering. This restricts the scope of the rendering allowing the process to be completed more quickly.

According to another embodiment, the invention provides an authoring system for editing three-dimensional scenes. The invention is implementable on a general purpose computer by programming it as follows. First and second synchronous threads are defined. The first thread is a user-data accepting thread that provides some sort of feedback whenever changes to a three-dimensional scene are entered by the user. The user may also enter data defining how the scene is displayed, such as the orientation of the camera used to form a particular wire-frame view. The first thread maintains the three-dimensional scene (updating it according to user inputs) and displays at least an abstract rendering, such as a wire-frame view. In the first thread, the entry of data, the updating of the scene, and the updating of the abstracted view are performed as a synchronous process. The second thread is executed in parallel with the first. The second thread maintains a realistic rendering of the three-dimensional scene which may involve ray-tracing. The idea being that the rendering process takes a substantial amount of time and therefore can be controlled to consume less resources so as not to hamper the authoring environment generated by the first thread. The rendered image may or may not be displayed continuously in the authoring environment. The first and second threads are substantially simultaneously executed so that the rendering may be displayed in the context of the authoring environment. The angular point of view of the realistic rendering is maintained substantially identical to the angular point of view of the abstract rendering. The first and second abstract renderings maintain substantially identical angular orientations with respect to a camera defining a point of view that defines the view of the abstract rendering. The realistic rendering may be placed in a position overlying a corresponding area of the abstract rendering so the abstract rendering provides visual orientation information relating to the realistic rendering. Optionally the first synchronous thread is executable at a lower priority than the second synchronous thread such that the a rate of execution of the first synchronous thread is substantially unaffected by the second synchronous thread. Alternatively the first and second synchronous threads are controlled such that the rate of execution of the first synchronous thread is substantially unaffected by the second synchronous thread. As a result, the user-interface maintained by the first synchronous thread performs without substantial increased delay caused by the computational demands of generating the realistic rendering. Preferably, the realistic rendering is displayable in a resizable window that can be adjusted to alter a number of pixels contained therein. This limits the computational demands of maintaining the realistic rendering. Another alternative to limiting the computational demands of the rendering is to allow the user to adjust the resolution of the realistic rendering. In a variation, the realistic rendering is subdivided into portions, selected portions being rendered sequentially by the second synchronous thread. The selected portions are those that are determined to change appearance as a result of the update data. This also reduces the computational demand by not reproducing rendered portions. In another variation, the second thread is interrupted when the update data is received and reinstated after the update data becomes available to the rendering process of the second thread. This insures that data, invalidated by update data, is not used in the rendering process. Invalidated portions may be blanked in a display prior to re-rendering so stale parts of the rendering are never displayed. Alternatively, the stale portions remain in the display until overwritten by the updated portions. This allows the author to see the old and new portions juxtaposed. Still another way to update the rendering display is to wait until all the portions are updated and to repaint the display in a single step. Moreover, it is possible to mark the display in some way so that it is clear it is invalid until the overwriting is performed. This could be done, for example, by stippling the display with black (or zero-alpha pixels) and momentarily painting with the old pixels of the old rendering and then painting with the updated pixels of the updated rendering.

According to another embodiment, the invention provides an authoring system for editing three-dimensional scenes. The invention is implementable on a general purpose computer by programming it as follows. First and second synchronous threads are defined. The first thread is a user-data accepting thread that provides some sort of feedback whenever changes to a three-dimensional scene are entered by the user. The user may also enter data defining how the scene is displayed, such as the orientation of the camera used to form a particular wireframe view. The first thread maintains the three-dimensional scene (updating it according to user inputs) and displays at least an abstract rendering, such as a wire-frame view. In the first thread, the entry of data, the updating of the scene, and the updating of the abstracted view are performed as a synchronous process. The second thread is executed in parallel with the first. The second thread maintains a realistic rendering of the three-dimensional scene which may involve ray-tracing. The rendered image may or may not be displayed continuously in the authoring environment. The first and second threads are substantially simultaneously executed so that the rendering may be displayed in the context of the authoring environment. The angular point of view of the realistic rendering is maintained substantially identical to the angular point of view of the abstract rendering with the second abstract rendering substantially identical to the first abstract rendering. In this embodiment, the realistic rendering is placed in a position overlying a corresponding area of the abstract rendering so the abstract rendering provides visual orientation information relating to the realistic rendering. A second abstract rendering, substantially identical to the first, is displayed simultaneously. The first and second abstract renderings are maintained with substantially identical angular orientations with respect to a camera defining a point of view that characterizes the view of the abstract renderings.

According to another embodiment, the invention provides an authoring system for editing three-dimensional scenes. The invention is implementable on a general purpose computer by programming it as follows. First and second synchronous threads are defined. The first thread is a user-data accepting thread that provides some sort of feedback whenever changes to a three-dimensional scene are entered by the user. The user may also enter data defining how the scene is displayed, such as the orientation of the camera used to form a particular wire-frame view. The first thread maintains the three-dimensional scene (updating it according to user inputs) and displays at least an abstract rendering, such as a wire-frame view. In the first thread, the entry of data, the updating of the scene, and the updating of the abstracted view are performed as a synchronous process. The second thread is executed in parallel with the first. The second thread maintains a realistic rendering of the three-dimensional scene which may involve ray-tracing. The first synchronous thread is executable at a lower priority than the second synchronous thread so the rate of execution of the first synchronous thread is substantially unaffected by the second synchronous thread. The realistic rendering is displayable in a resizable window that can be adjusted to alter a number of pixels contained therein and thereby limit the computational demands of maintaining the realistic rendering.

According to another embodiment, the invention provides an authoring system for editing three-dimensional scenes. The invention is implementable on a general purpose computer by programming it as follows. First and second synchronous threads are defined. The first thread is a user-data accepting thread that provides some sort of feedback whenever changes to a three-dimensional scene are entered by the user. The user may also enter data defining how the scene is displayed, such as the orientation of the camera used to form a particular wire-frame view. The first thread maintains the three-dimensional scene (updating it according to user inputs) and displays at least an abstract rendering, such as a wire-frame view. In the first thread, the entry of data, the updating of the scene, and the updating of the abstracted view are performed as a synchronous process. The second thread is executed in parallel with the first. The second thread maintains a realistic rendering of the three-dimensional scene which may involve ray-tracing. The execution of the second thread is interrupted when the update data is received. Execution is reinstated after the update data becomes available to a rendering process of the second thread. This is done so as to prevent rendering of portions of the realistic rendering corresponding to portions of the scene data invalidated by the update data.

The invention also provides a method of generating a user-interface for authoring a three-dimensional scene. The method has the following steps: storing a 3D scene in a memory; receiving edits entered by an author, to the 3D scene; updating the 3D scene in response to the edits; displaying an optimized view of the scene using display modes supported by OpenGL library (ex. wire-frame, shaded, etc.) of the 3D scene; simultaneous with the step of displaying a wire-frame view, also generating a rendered view of the 3D scene, the rendered view showing a result of ray-tracing the 3D scene; maintaining an orientation of the rendered view identical to an orientation of the wire-frame view so that when the orientation of the wire-frame view is changed, the orientation of the rendered view is automatically changed in tandem.

The invention also provides a method of generating a user-interface for authoring a three-dimensional scene, comprising the steps of: storing a 3D scene in a memory; receiving edits to the 3D scene applied by a user; updating the 3D scene responsively to the edits; displaying a wire-frame view of the 3D scene; simultaneous with the step of displaying a wire-frame view, also generating a rendered view of the 3D scene; maintaining a currency of the rendered view responsively to the edits by continuously rendering portions of the 3D scene that are visible in the rendered view in a first process parallel to a second process of the steps of receiving, updating, and displaying the wire-frame view, the first process being asynchronous with respect to the second process. The step of maintaining may included controlling the first and second processes such that the second process is substantially unaffected by the first process. The second process may be executable at a lower priority than the first process.

Another embodiment of the invention is a method for providing an interface for authoring a three-dimensional scene. The steps are: storing a 3D scene in a memory; receiving edits to the 3D scene applied by a user; updating the 3D scene responsively to the edits; displaying a first wire-frame view of the 3D scene; simultaneous with the step of displaying a wire-frame view, also generating a rendered view of the 3D scene, the rendered view showing a result of ray-tracing the 3D scene; continuously and automatically displaying the rendered view; displaying a second wireframe view; maintaining an orientation of the second wire-frame view substantially identical to the orientation of the first wire-frame view; and displaying the rendered view in a corresponding area and at an identical zoom level as the first wire-frame view and on top of the first wire-frame view such that the wire-frame serves to orient the rendered view.

Another embodiment of the invention is a method generating an image corresponding to a 3D scene. The steps are: storing the 3D scene in a memory (a view being defined by a position and orientation of a camera object of the 3D scene, the view being further defined by a field of view and a magnification, and the field of view being divided into tiles, the tiles being adjacent portions of the field of view); accepting update data specifying modifications to the 3D scene; interrupting a rendering process responsively to the step of accepting; the rendering process sequentially rendering tiles identified in a list of invalid tiles; the rendering process including ray-tracing at least a portion of the 3D scene; updating the 3D scene stored in the memory responsively to the step of accepting; identifying tiles rendered invalid by the update data and updating the list of invalid tiles responsively thereto; restarting the rendering process with the list updated in he step of identifying. Optionally, the method includes blanking a display of each of the tiles identified as invalid in the step of identifying. It may also include continuously and automatically displaying a result of the rendering process. It may also include determining if the update data would affect an appearance of any tile and skipping the step of interrupting when a result of the step of determining indicates that the update data would not affect the appearance of any tile.

Another embodiment of the invention is a method including: storing the 3D scene in a memory; a view being defined by a position and orientation of a camera object of the 3D scene; the view being further defined by a field of view and a magnification; the field of view being divided into tiles, the tiles being adjacent portions of the field of view; rendering the 3D scene; accepting update data specifying modifications to the 3D scene; determining if the update data would affect an appearance of any tile and interrupting the step of rendering responsively to the step of accepting when a result of the step of determining indicates that the update data would affect the appearance of any tile; the rendering step including sequentially rendering tiles identified in a list of invalid tiles; the rendering step including ray-tracing at least a portion of the 3D scene; identifying tiles rendered invalid by the update data and updating the list of invalid tiles responsively thereto; and restarting the step of rendering with the list updated in the step of identifying. The step of accepting and the step of rendering may be performed asynchronously with respect to each other. The step of rendering and the step of accepting may be performed at a higher priority than the step of rendering. The step of rendering may include limiting a scope of objects to be rendered by restricting the rendering to objects identified in a list and restricting a number of pixels making up a result of the step of rendering according to a screen area definition entered by a user. Also, simultaneous with the step of displaying a wire-frame view, the method may include also displaying a rendered view of the 3D scene resulting from the step of rendering, the rendered view showing a result of ray-tracing the 3D scene. In addition the method may include displaying a second wire-frame view and maintaining an orientation of the second wire-frame view substantially identical to the orientation of the first wire-frame view. In addition, the step of displaying the rendered view may include displaying the rendered view in a corresponding area and at an identical zoom level as the first wire-frame view and on top of the first wire-frame view such that the wire-frame serves to orient the rendered view. Also, the step of displaying the rendered view may include displaying the rendered view in a corresponding area and at an identical zoom level as the first wire-frame view and on top of the first wire-frame view such that the wire-frame serves to orient the rendered view.

BRIEF DESCRIPTION OF THE DRAWINGS

FIGS. 7a–7c illustrate an animation sequence and the generation of an object-following render region.

DETAILED DESCRIPTION OF THE PREFERRED EMBODIMENTS

Figure 1:
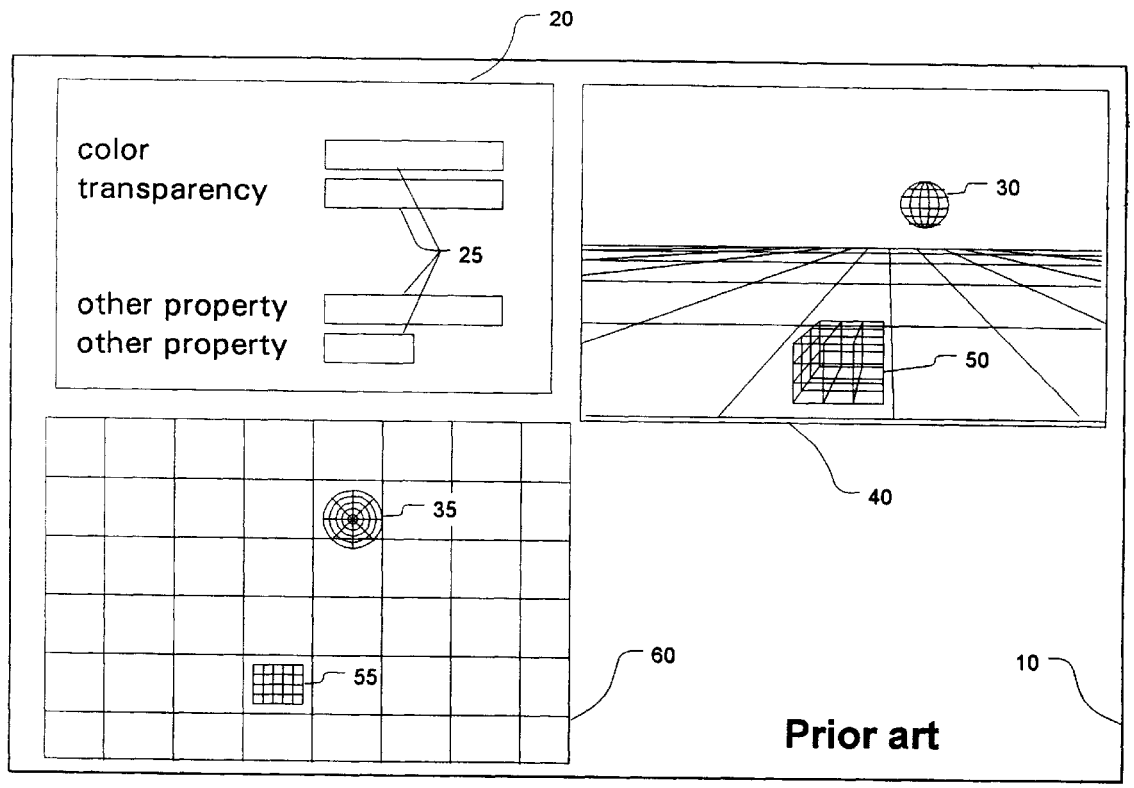
FIG. 1 shows an example of a prior art authoring environment in which two wire-frame views are displayed along with a shader editor in an editing context.
Figure 2:
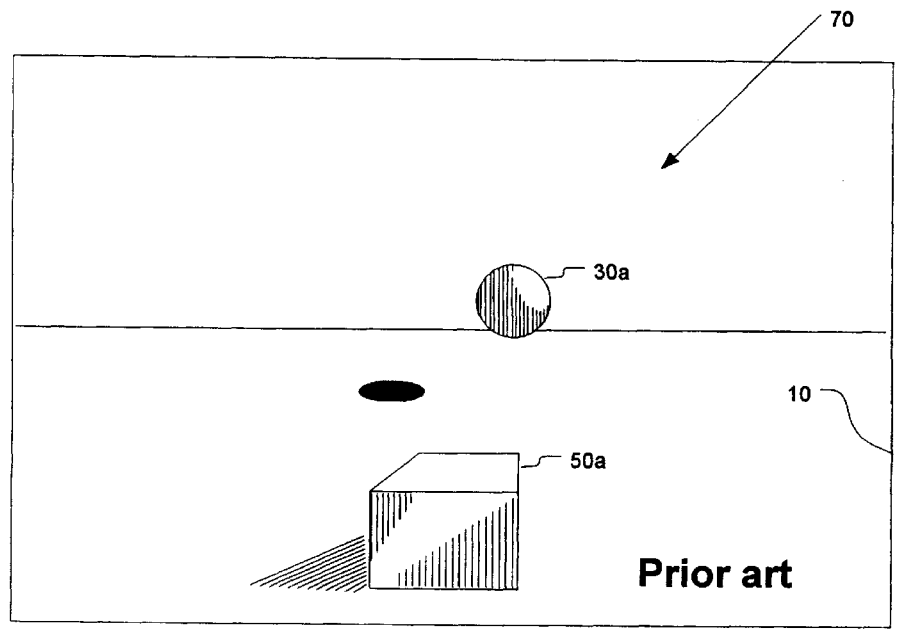
FIG. 2, shows an example of a prior art authoring environment in which a rendered image is shown in a preview context.
Figure 1A:
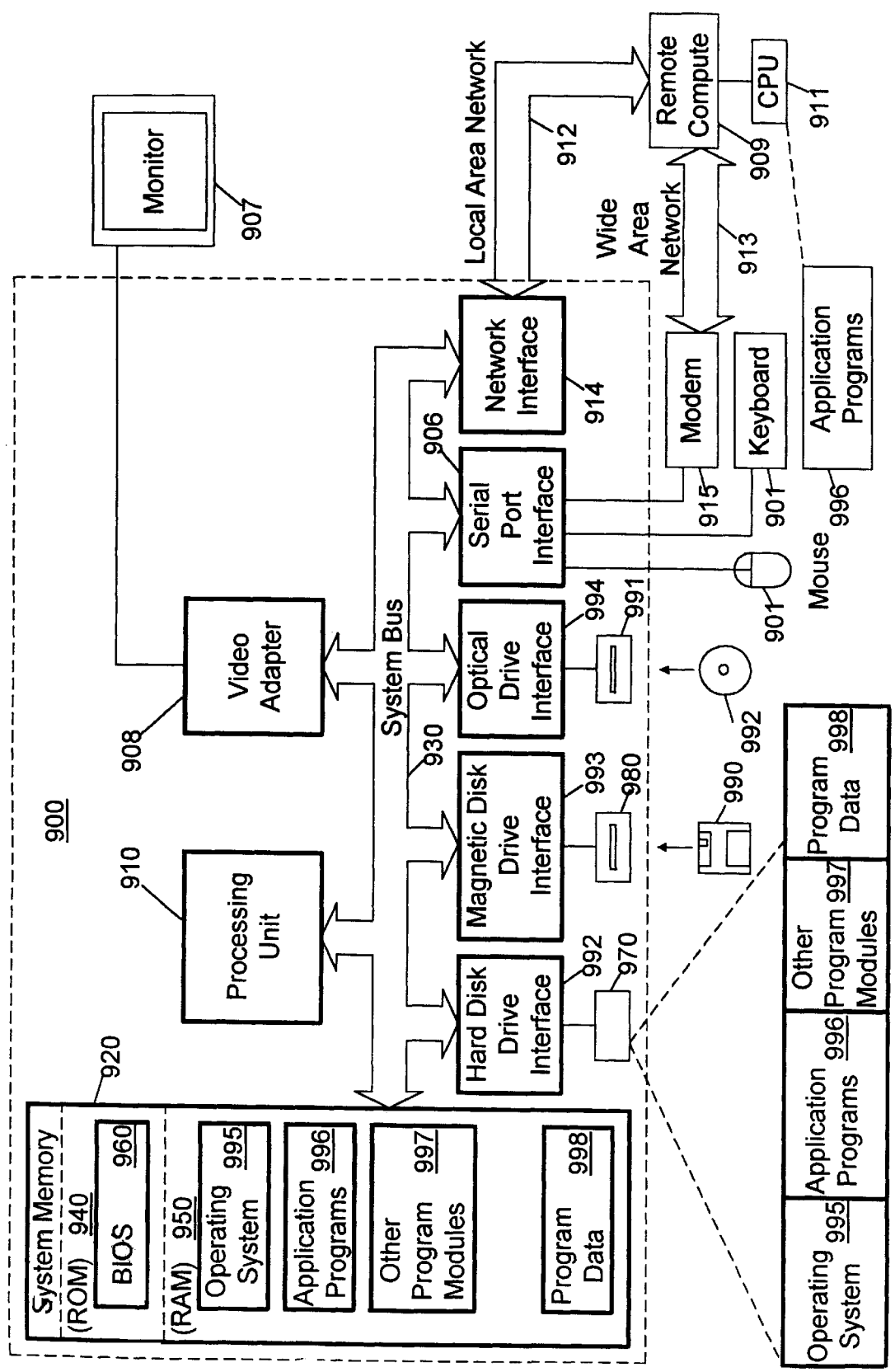
FIG. 1A illustrates a conventional computer system according to the prior art.

Referring to FIG. 1A, a suitable computing environment in which the invention may be implemented, with various computer system configurations such as the one depicted. Note that the invention may be practiced in distributed computing environments, where tasks are performed by remote processing devices linked through a communications network with program modules located in local and/or remote storage devices. An exemplary system includes a conventional personal computer 900, with a processing unit 910, a system memory 920, and a system bus 930 interconnecting system components, including the system memory to the processing unit 910. The system bus 930 may be any structure including a memory bus or a memory controller, a peripheral bus, or a local bus. The system memory includes read only memory (ROM) 940 and a random access memory (RAM) 950. A basic input/output system 960 (BIOS), containing the basic routines that helps to transfer information between elements within the personal computer 900, such as during start-up, is stored in ROM 940. The personal computer 900 further includes a hard disk drive 970, a magnetic (e.g., floppy) disk drive 980 with a removable magnetic disk 990, and an optical disk drive 991 with a removable optical disk 992. The hard disk drive 970, magnetic disk drive 980, and optical disk drive 991 are connected to the system bus 930 by a hard disk drive interface 992, a magnetic disk drive interface 993, and an optical disk drive interface 994, respectively. Other types of computer readable media may be used to store data as well, such as magnetic cassettes, flash memory cards, digital video disks, Bernoulli cartridges, random access memories (RAMs), read only memories (ROMs), and the like.

Program modules may be stored on the hard disk, magnetic disk 990, optical disk 992, ROM 940 or RAM 950, including an operating system 950, one or more application programs 996, other program modules 997, and program data 998. A user may enter commands and information into the personal computer 900 through input devices such as a keyboard 901 and a pointing device 901. Other input devices (not Shown) may include a microphone, joystick, game pad, satellite dish, scanner, or the like. These and other input devices are often connected to the processing unit 910 through a serial port interface 46 that is coupled to the system bus, but may be connected by other interfaces, such as a parallel port, game port or a universal serial bus (USB). A monitor 907 or other type of display device is also connected to the system bus 930 via an interface, such as a video adapter 908. In addition to the monitor, personal computers typically include other peripheral output devices (not shown), such as speakers and printers.

The personal computer 900 may operate in a networked environment using logical connections to one or more remote computers, such as a remote computer 909. The remote computer 909 may be another personal computer, a server, a router, a network PC, a peer device or other common network node, and typically includes many or all of the elements described above relative to the personal computer 900, although only a CPU 911 has been illustrated in FIG. 1. The logical connections depicted in FIG. 1 include a local area network (LAN) 912 and a wide area network (WAN) 913. Such networking environments are commonplace in offices, enterprise-wide computer networks, intranets and the Internet.

When used in a LAN networking environment, the personal computer 900 is connected to the local network 912 through a network interface or adapter 914. When used in a WAN networking environment, the personal computer 20 typically includes a modem 915 or other means for establishing communications over the wide area network 913, such as the Internet. The modem 915 is connected to the system bus 930 via the serial port interface 906. In a networked environment, program modules, or portions thereof, may be stored in the remote memory storage device. It will be appreciated that the network connections shown are exemplary and other means of establishing a communications link between the computers may be used.

As is familiar to those skilled in the art, the computer system 900 further includes an operating system and at least one application program. The operating system controls the computer system's operation and the allocation of resources. The application program is a set of software that performs a task desired by the user, making use of computer resources made available through the operating system. Both may be resident in the illustrated memory 920 or in another store as suggested above.

In accordance with the practices of persons skilled in the art of computer programming, the invention may be described with reference to acts and symbolic representations of operations that are performed by the computer system 900, unless indicated otherwise. Such acts and operations are sometimes referred to as being computer-executed. It will be appreciated that the acts and symbolically represented operations include the manipulation by the CPU 910 of electrical signals representing data bits which causes a resulting transformation or reduction of the electrical signal representation, and the maintenance of data bits at memory locations in the memory system 22 to thereby reconfigure or otherwise alter the computer system's operation, as well as other processing of signals. The memory locations where data bits are maintained are physical locations that have particular electrical, magnetic, optical, or organic properties corresponding to the data bits.

In an illustrative embodiment of the invention, the computer system 20 preferably uses the Windows 95 or Windows 98 client server operating system. However, other client/server operating systems (e.g. Windows NT, O/S2 by IBM, Mac OS, UNIX, Windows CE, etc.) can also be used. A client/server operating system is an operating system which is divided into multiple processes of two different types: server processes, each of which typically implements a single set of services, and client processes, which request a variety of services from the service processes. Object oriented programming is used to design the client/server operating system, and applications which run under the client/operating system, where objects represent system resources.

For example, the Windows 95 client/server operating system provides shareable resources, such as files, memory, processes and threads, which are implemented as "objects" and may be accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within the computer memory 920 and represent specific electrical, magnetic or organic elements.

An "object type," also called an "object class," comprises a data-type, services that operate in instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through the object pointer. An application obtains this object reference by using some type of function call (direct or implied) in which that function allocates an object block in computer memory, initializes the function table, and returns the reference to the computer memory to an application. The computer memory may be local or distributed on a remote computer.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the threads process. Thus, the actual data comprising a threads context varies as it executes.

Figure 3:
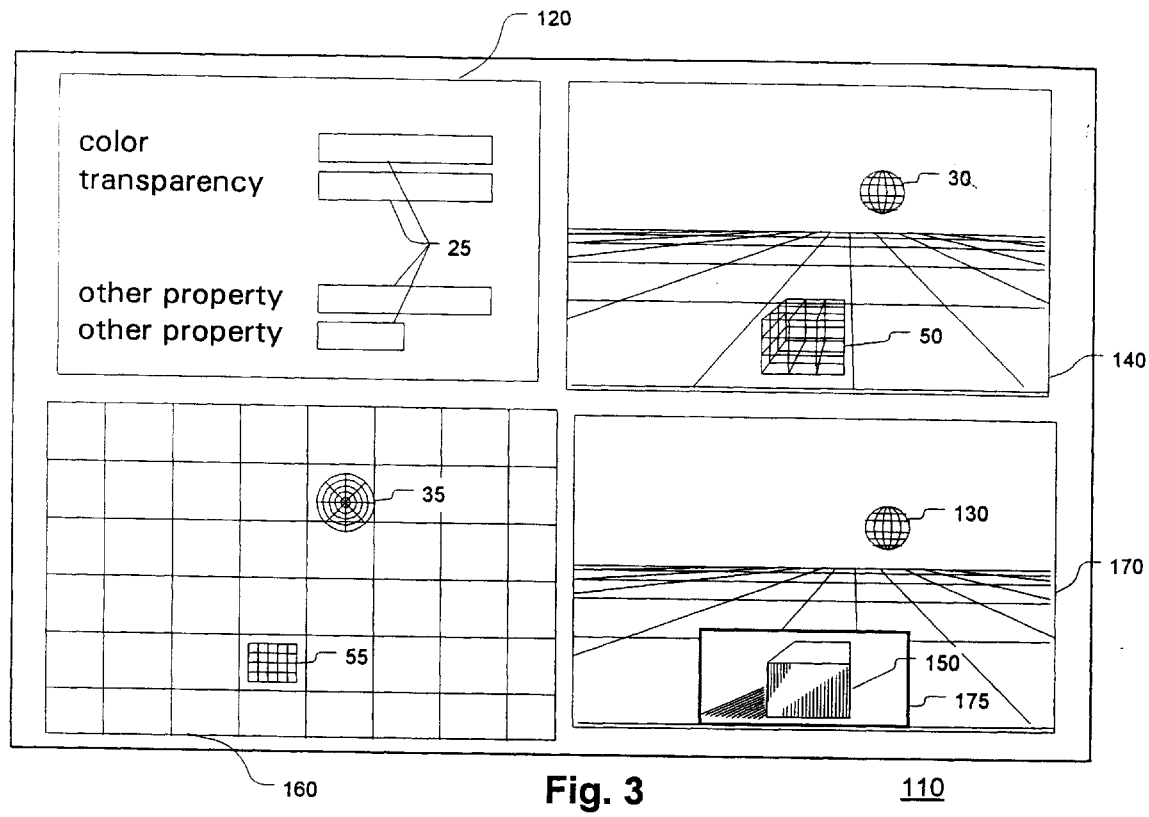
FIG. 3 shows an example of an authoring environment, according to the invention, in which three wire-frame views, one with a rendered preview region, are displayed along with a shader editor in an editing context.

Referring to FIG. 3, an exemplary screen shot 110 that may be made available through an implementation of the invention includes a shader editor window 120, two perspective 3D wire-frame views 140 and 170, and a top wire-frame view 160. One of the perspective wire frame views 170 shows an outlined render region 175 that may be moved or resized. Inside the render region, the underlying wire-frame objects have been fully rendered. That is, the portion of the scene defined by the boundaries of the render region 175 are rendered and shown in place inside the window of the render region 175. Thus, while most of the wire-frame view 170 appears, for example, as black and white lines, the portion of the view inside render region 175 appears as it would in a rendered view after the application of the ray-tracing algorithms.

The author places the render region 175 on the part of the view 170 corresponding to the part of the scene whose rendering is of interest. For example, if the author is editing the properties of a single object, the author might place the render region 175 over the object and size the region 175 to surround the object and a small part of an adjacent area, for example, part of another object on which the first object casts a shadow. By placing the render region on top of the wire-frame view, the author is able to better see the rendering relative to the framework of control points, manipulators, guides, etc. that appear in the wire-frame view.

Rendering of the render region 175 is performed automatically and continuously as the author interacts with editing controls. Thus, the render region always shows a rendered view that corresponds to the author's current edits, to the extent the rendering process is able to remain current.

In the editing environment, as shown in FIG. 3, all the conventional authoring tools are available. The editing environment provides full access to the editing tools normally associated with the editing environment. The editing environment still provides and maintains the abstracted views, 3D manipulators, and control points that are helpful for working with 3D scenes. Importantly, access to the editing tools is not hindered by the need to wait for completion of the rendering process. In addition, tools for resizing and repositioning the render region window 175 are available. In a preferred embodiment, normal authoring functions take precedence over the function of providing the updated image in the render region. To allow this, the process of accepting scene modifications entered by the user is done in parallel with, and at a higher priority than, the processes of providing the freshest possible rendering. So for example, if the author moves an object 130, the wire-frame will be repainted in the wire-frame views before the render region 175 is re-rendered and repainted. Thus, the refreshing of the render region 175 would proceed as resources are available. Of course, depending on the hardware implementation, the parallel process of rendering the render region 175 may use resources (such as a parallel processor) that would make it unnecessary to prioritize and the rendering would continue with the conventional features of the authoring system.

In the embodiment of FIG. 3, the rendered region 175 overlays a perspective wire-frame view 140 whose view orientation matches that of another wire-frame view 170. This helps the author to compare and correlate the information displayed in the other wire-frame view 140 with the rendered view. Defining the region as a subportion of, and directly overlaying, a wire-frame view, not only provides a convenient mechanism for defining the location and the size of the region 175, it also allows the author to obtain a perspective about the rendered view that may not be as easy to obtain if an entire view were rendered, say for example if the rendering were displayed in its own view rendered throughout. Suppose the color-difference or contrast between a background and foreground object in a scene is fairly low. Also assume these objects are partly covered by the render region 175 so that they extend partly within and partly without the render region 175. The high contrast wire-frame image of these objects, along with any control points and non-visible guides and/or manipulators, is visible and enhances the author's orientation and also helping the author manipulate objects, which may be done in the same view 170 as the render region 175.

An important consequence of the orientation and clarity provided by the wire-frame adjacent the render region 175 is that it allows the author to minimize the size of the render region 175. Because the wire-frame shows it, the author does not need to a larger proportion of the scene in the render region 175 to provide a visual frame of reference.

Note that, as used in this specification, the term "view" is sometimes used to connote what is defined by a camera position and orientation without any reference to the magnification and field of view (assuming depth of focus is not considered in the context of "view") associated with an image that might be produced from the camera vantage. Thus, a fish-eye view and a zoom view with different fields of view, but both from the same camera vantage, would be the same "view" as used in this broader sense. The term "view" is also used in this specification to connote something more specific. That is, the term is used in some cases also to specify a particular field of view, and perhaps even more narrowly to specify a particular magnification. Where the term is used in this specification without specifically indicating a particular one of these possible definitions, it is believed the context of the usage either makes it clear or that any of the meanings could apply. In the claims, the term, "view" is used in its broadest sense, except where further limitations in the claim specify or narrow the definition.

Figure 5:
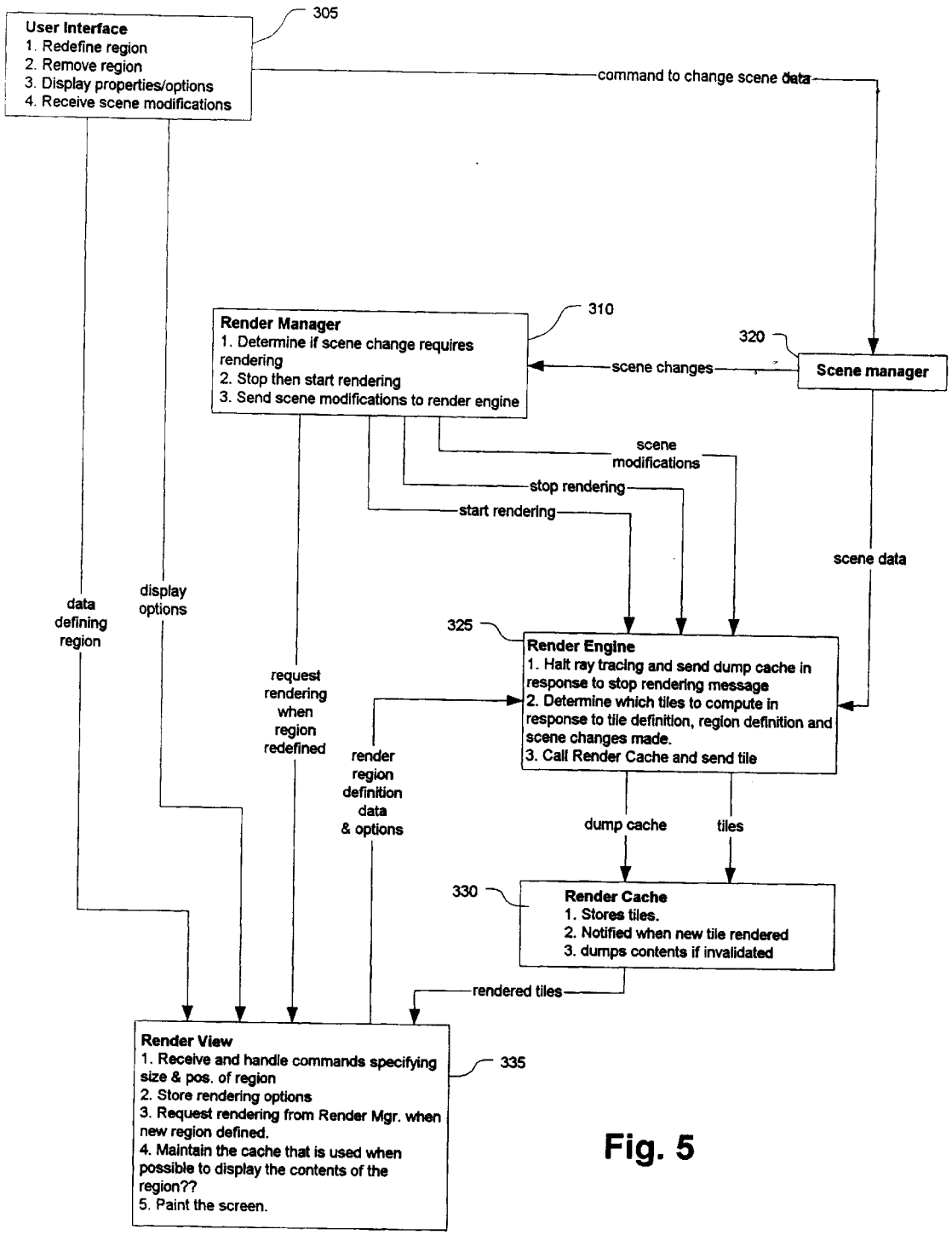
FIG. 5 shows a block diagram showing data flow between objects and the functions of objects corresponding to one possible object-oriented implementation of the invention.

Referring to FIG. 5, the invention may be implemented in an object-oriented program. FIG. 5 shows a particular example of objects and data flows that may be used as a framework for an object-oriented implementation. The architecture may be based on, for example, Microsoft's Component Object Model (COM) technology, with the components (objects) inter-operating using custom COM interfaces. The following description is abstracted and each object described could actually consist of a number of component objects that interact to provide the functions described. The architecture is based on the notification model. Components communicate asynchronously.

Three separate threads are defined in the example object-oriented implementation: (1) support for the user interface, (2) rendering, and (3) screen-painting of rendered portions. As discussed above, the user interface support function may have the higher priority. Alternatively, the separate threads may be controlled in some other way to insure the user-interface is not unduly slowed by the rendering thread.

Figure 4:
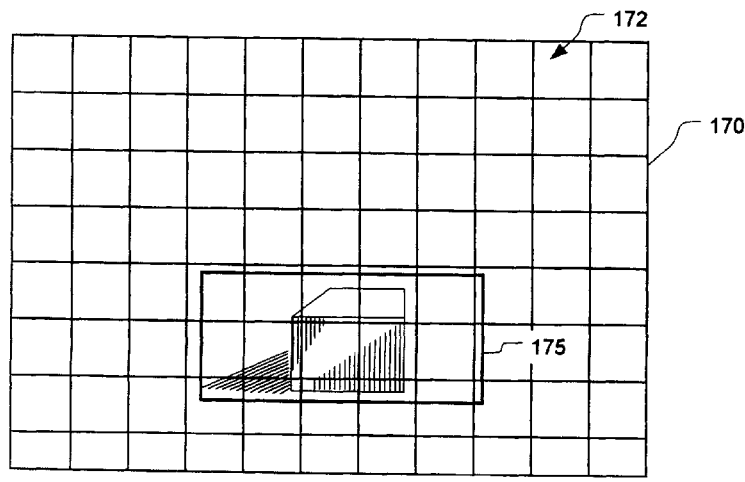
FIG. 4 shows a wire-frame view of a 3D scene with lines indicating how the view is broken into tiles for use with a particular embodiment of the invention.

Referring now also to FIG. 4, in certain embodiments, the view 170, of which the render region 175 is a part, is broken into tiles 172. The render region's 175 boundaries may or may not cut across the boundaries of a tile 172, but it is expected that when sized to be a substantial fraction of the entire wire-frame view 170 the region 175 overlays, the render region boundaries will cut across many tiles 172 so that the render region may contain multiple tiles 172 and fractions of multiple tiles 172. In the embodiment, the following objects may be defined:

A user interface object 305 handles functions supporting the user interface. In addition to the support of conventional user-interface features, the user-interface object 305 allows the render region to be positioned and sized. In addition to accepting scene definition data and modifications, it also supports user-entry of rendering options such as the alpha compositing option and any others associated with the render region. The conventional aspects of the user-interface provide for the tailoring of the wire-frame view over which the render region is painted. This data is used in performing the rendering. The user-interface 305 responds conventionally in the sense that it supports all functions conventionally-connected with the authoring environment. In alternative embodiments, the user-interface object 305 also allows the user to summon and close a rendered view. Data defining the render region may be supplied to the render view object where it may be stored and made available to, for example, the render engine object 325.

Render Manager: The render manager 310 is responsible for starting and stopping the render engine. This object receives scene changes and determines if the changes are of a type that may require a render region update (such as a change in a surface texture of an object) or a change that is not displayable (such as the name of an object or its grouping with other objects). When a change is determined to be displayable, the render manager halts rendering by sending a stop rendering command to the render engine. The updates are sent to the render engine so the render engine can determine which tiles must be re-rendered. The updated scene data can be obtained from the central store or constructed by the render manager if the render engine requires it in a different format.

The render manager 310 creates, terminates, and synchronizes the thread of operations that define the tasks involved in rendering. This prevents blocking of the editing system. The render manager 310 registers a data notification sink interface to the system's central scene manager 320, the central store where the scene's current definition is stored. When the scene data changes, the render manager is notified by the scene manager 320. A bit field may be used to classify every change of the scene data. The bit field may take the classification into account in determining if the change requires re-rendering.

The render manager 310 receives scene modifications from the scene manager and selectively passes these modifications to the render engine. If a scene modification is global in nature, the render manager determines this before passing the scene modification data to the render engine. If a global parameter, for example, the ambient light intensity of the scene, is modified, the rendering of the render region portion of the scene is invalidated. The render manager issues a corresponding command to the render engine that directs the render engine to abort any rendering processes. The render engine passes on a command to the render cache to empty the cache. This prevents the render engine and render cache from consuming resources unnecessarily by rendering parts of the scene that are invalid. In the instant embodiment, the rendering process proceeds tile by tile. When a global parameter, one that affects the entire rendering's appearance, is changed, the effect of the abort-rendering empty-cache commands is that the render engine stops rendering tiles and the render cache dumps any rendered tiles waiting to be picked up by render view to refresh the display of the render region.

When the user enters any commands to move or resize the render region, this data is sent from the user interface to the render view. The render view sends an indication of the change to the render manager so that the render manager can initiate re-rendering accordingly. Note the modification of the render region may cause the same chain of events as scene modifications. That is, the render region must be updated when the region is redefined just as it must be updated when the scene is modified.

Render Engine 325: This object receives instructions to start and stop rendering from the render manager 310. Scene data are obtained from a scene manager 320 which is a central store of scene data. The scene manager may store scene definition data in a format that is different from that used by the render engine. In that case, the scene manager will convert the format as required. Also, synchronization of the scene data from the scene manager 320 and scene modifications transmitted to the render engine 325 by the scene manager 320 (from the user-interface 305) are handled by the render manager 310.

Scene modifications resulting from user-input are supplied to the render engine 325 through the render manager 310. The render engine 310 can then determine what parts of the render region 175 must be refreshed and perform the required rendering. In the preferred embodiment, as discussed, the image area is broken into tiles 172. Thus, the render engine, in that case, may determine from the dimensions (coordinates) of the tiles and the coordinates of the particular scene modifications, the particular tiles that must be re-rendered. The render engine 325 then renders those tiles 172 sequentially, and as each tile's rendering is completed, apply the data defining the rendered tile to the render cache 330. This process of rendering the tiles proceeds in parallel with the maintenance of the user interface (accepting scene modifications, updating wire-frame views, etc.) and the scene-modification-filtering process performed by the render manager 310. The speed of updating the rendering is increased further by identifying and re-rendering only the tiles that are affected by the author's modifications. For example, if changes are made to the texture of a surface of an object, only certain tiles may need to be rendered again.

The render engine continuously supplies rendered tiles to the render cache as the tiles are rendered.

Render engine 325 may send commands to render cache 330 to blank invalid tiles so that the corresponding region shows nothing until a valid tile is supplied to render cache 330 to replace the invalid ones. Alternatively, the latest valid tile may be left in place until a new one is received, which would enhance comparison of the "old" and "new" versions. As discussed elsewhere, this juxtaposition may be useful to the author. This feature may be included among the render options (e.g., Blank invalid tiles or Overwrite when updated). Another alternative is to dump the cache only when all the tiles are to be re-rendered and overwrite tiles when specific ones are determined to require rendering.

Render Cache 330: This object stores rendered tiles after the tiles are rendered by the render engine 325. The render cache 330 may also dispose of obsoleted tiles stored therein responsively to a command from the render manager 325 or render engine 325. Emptying render cache 330 has the effect of blanking the render region so that no objects are displayed until a valid rendering is available for the respective tiles.

Render View 335: This object receives, stores, and implements commands specifying the size and location of the render region 175. This render region definition data is also made available to the render engine 325 which may use it to determine the tiles to be rendered. The render view object 335 also stores rendering options, for example, sampling and painting speed. One example of a rendering option that can further enhance rendering speed is to, for purposes of rendering, specify that all lights are to be rendered as point lights rather than area lights, the former taking less time to render. These options may have to be supplied to the render engine. This object may also generate requests for a new rendering of certain tiles when the render region is redefined. The latter function may also be handled by the render manager. Region definition data may be supplied to the render engine (so, for example, it may determine which tiles need to be updated by scene modifications or region re-definitions). Finally, the render view object is responsible retrieving tiles from the render cache and for painting the region in response to the reception of newly rendered tiles.

Figure 6:
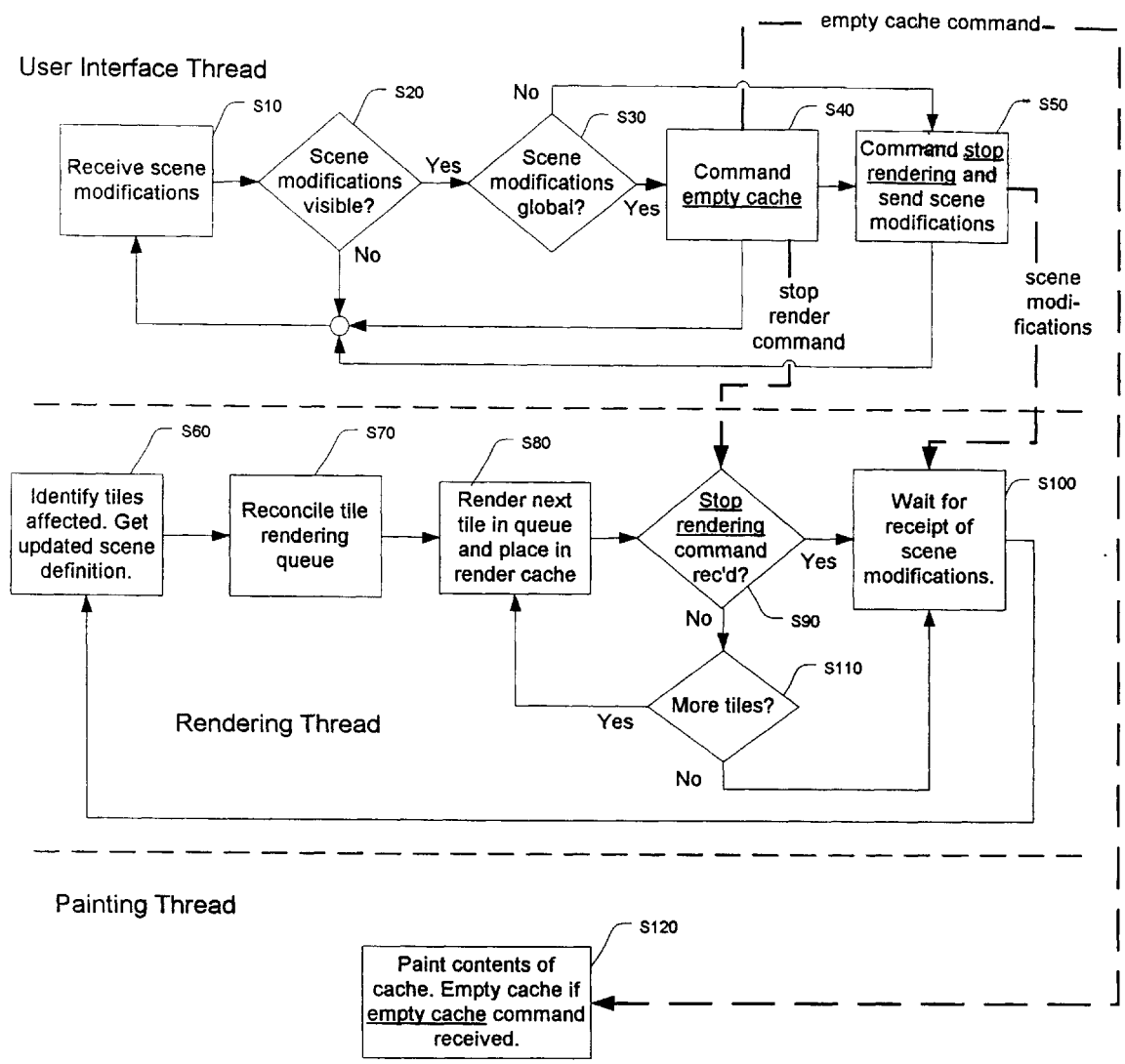
FIG. 6 shows a flowchart indicating parallel processes corresponding with an embodiment of the invention.

The invention may be implemented in a number of different ways. Referring now to FIG. 6, a flowchart defining an embodiment of a program to implement the invention has three independent threads that execute in parallel. A user interface thread (actually, in this embodiment, an intermediate process linking the greater proportion of user-interface maintenance tasks with the rendering process, and which may operate as a separate thread from the maintenance of the user-interface), a relevant portion of which is shown in FIG. 6, receives scene modifications in a first step S10. In step S20, if the scene modifications received are such as to affect the appearance of the rendering, such as a surface shader property, control passes to step S30. If the scene modifications are such as not to require any change in the displayed rendering, such as a change in scene object grouping or name, control returns to step S10. At step S30, if scene modifications are global in nature, that is, they affect every tile 172 in the render region 175, control passes to step S40, otherwise control skips to step S50. In step S40, a command to stop rendering is applied to the rendering process at step S90 which is discussed below. Also, step S40 issues a command to empty the cache where rendered tiles are stored. This causes the render region to either blank or display the outdated rendering. As discussed, the empty cache command may be subject to a render region view option in which case, the render region may be left intact and invalid tiles simply overwritten when valid tiles are rendered. At step S50, the rendering is stopped.

In the rendering thread, the process begins with the receipt of scene modifications at step S100. Control proceeds to step S60 where the tiles that must be rendered are identified and queued up. Actually the queue may be merely a list of tiles that must be re-rendered. For example, if the region is moved a distance smaller than a corresponding dimension, only a portion of the region will need to be re-rendered. Those tiles in that portion will not be queued. Note that identifying the tiles to be re-rendered may make use of a know technology that maps secondary reflections by pixels such that it can be determined, for example, which subportions of the scene must be re-rendered when a particular object's shader is modified. This can be determined because that object produces secondary reflection on only certain other objects whose pixel positions have been determined from past renderings. This technique is called pixel tagging and is a preferred rendering technology for implementing the present invention.

In step S70, the current queue of tiles to be rendered based on the penultimate scene modifications is reconciled with the tiles required to be rendered based on the most recent modifications. Control then passes to step S80 where the next (or first) tile in the queue is rendered. Control then passes to step S90 where it is determined if a stop rendering command has been received. If so, the process waits at step S100 for new scene modifications. If no stop rendering command is received at step S90, control passes to step S110 where it is determined if any tiles remain in the queue. If so, control returns to step S60 and if not, to step S100. Note that another process may be added to the render thread process to pause it to insure that it does not utilize resources employed in maintaining aspects of the user-interface other than maintenance of the render region. This is easily implemented and thus not shown in the drawing. Note also that, although the flow chart only mentions scene modifications at step S100, changes that affect the render region, such as the position and size, would also be treated similarly.

The final parallel process involved in maintaining the image shown in the render region is the painting of the contents of the cache of rendered tiles onto the render region. This process involves checking and implementing the latest render region definition.

The region can be connected with an object such that, in generating a "flipbook" the region moves with the object allowing animation sequences to be previewed more quickly. One embodiment is now described with reference to FIGS. 7a–7c. A view 450 of an animation sequence is shown at three time steps: a first time step corresponding to FIG. 7a, a second time step corresponding to FIG. 7b, and a third corresponding to FIG. 7c. A single three dimensional prism 410/420/430 moves through the scene. The prism is shown in the position corresponding to the first time step at 410. The prism is shown in the position corresponding to the second time step at 420. The prism is shown in the position corresponding to the third time step at 440. The camera position is shown at 470. A radial center line is indicated by 405. A single point c is defined that is fixed with respect the object. Another single point a is defined that is fixed with respect to a moving render region 455. The render region 455 is moved relative to the view 450 such that the point a remains on the radial center line 405 joining the object point c and the camera. As the prism 410/420/440 moves in forward time, it rotates, it moves radially away from the camera 470 and it translates in the x and y directions. The view 450 and the render region 455 are depicted as rectangular apertures and could be placed anywhere relative to the camera to represent the solid angular region displayed on the screen. Lines 400a–400d show the radial lines connecting the corners of the render region 455 with the camera 470. If the prism 410/420/440 changed shape as time progressed, this would present no problem since there may be defined a coordinate system for the object and the point c could be fixed in that object coordinate system.

Alternatively, the render region aperture 455 can be dynamically sized and located, with respect to the moving object 410/420/400, by generating it so that it is just large enough to show the selected object. The computer would do this dynamically in response to a command from the user to render the selected object. It may also be defined to include a margin, for example, to show a glow or haze effect around the boundaries of the object. The latter method makes it simpler for a user to define the region and referencing it to the object. However, it is not convenient if only a portion of the object being evaluated is of interest. Thus, time can be save by identifying a particular point in the object's own coordinate system.

Note that the rendering of the render region need not include a rendering of the entire included scene. The render region, for example, may be just a beauty pass of a selected object or objects. The term, beauty pass, characterizes a rendering in which only selected object(s) are actually rendered realistically and the remainder is left unrendered or rendered abstractly.

The invention provides features that make it possible to integrate a realistic rendering into the environment of an 3D editing user interface. These feature affect the (1) speed of rendering, the (2) synergistic integration of the rendered image into the typical editing working environment, (3) insuring the time-consuming process of rendering does not interfere with the editing user-interface, and (4) insuring that rendering utilizes minimal computer resources as well as (5) features that relate to optimizing the rendering feature in accord with the author's specific needs.

1) Speed of Rendering:

The user is permitted to define precisely the smallest rendered region required for purposes of editing.

Only changes to the parameters that affect the rendering interrupt the rendering. Changes to all other properties of the 3D scene (e.g., the name of the object) won't affect the rendering in process.

Sub-portions of render region that require refreshing are submitted to the rendering process while skipping the re-rendering of sub-portions that would remain the same.

Provide shortcuts for render region image that speed up the process of rendering. For example, the user can implement a render region option that causes all light sources to be treated as point sources rather than area lights.

Removing potential for redundant rendering by halting rendering process and reconciling new updates with any prior updates queued for rendering. When scene modifications are transmitted to the rendering thread, the rendering process may identify the tiles that must be rendered to insure the rendering corresponds to the scene. It queues these tiles (the queue possibly being merely an enumerated list of tiles to be re-rendered). Identifying the tiles to be rendered may be done by comparing the current scene definition (either stored in its own format or obtained from a common scene-definition data structure) with the modifications. The rendering process may then update a scene definition (or this could be done by an external process that maintains the common scene definition and the updated data used in the process of rendering) and use this updated data to render the tiles. Of course, the queue must also be updated to reflect the tiles that must be re-rendered. The process may also issue commands to remove invalid tiles from the render cache so that they are not displayed. Each time a new modification is sent to the rendering thread, the rendering thread is interrupted until the current changes are integrated into the current scene data insuring that the scene data used for rendering is current. This insures that resources available for rendering of tiles are always used to maximal effect.

2) Seamless and Synergistic Integration into Editing Environment

Implementation of the rendering process may provide uninterrupted priority to the user-interface. This is accomplished by separating the rendering process as a parallel and independent process, thereby preventing the rendering process from blocking any features of the user interface.

The render region may be displayed with control points on top of a wire frame view which provides orientation as well as a convenient context for resizing and repositioning the region.

The rendering may be displayed automatically without requiring any steps by the user. None of the controls normally available in the editing context is interfered with or hindered. In fact, the rendered image may be provided such that it can be selectively invoked and hidden, so that it is only present on the editing screen (although the rendering may be continually maintained so that it is not painted on the screen) when desired.

The rendering may be displayed on one of dual parallel wire-frame views. The view without the rendered region displays all control points, guides, and manipulators of a conventional wire-frame view. Thus, this view can be used for changing the perspective, object manipulations, etc. while, simultaneously, the render image is displayed in a position that corresponds clearly with (by virtue of the fact that the second wire-frame view shows the same scene perspective) the wire-frame being manipulated.

3) Insuring Rendering doesn't Interfere with Editing User-interface

Rendering is done in parallel with the support for the user-interface. Thus, user interface support tasks do not have to wait for rendering to be completed.

The thread that supports the user interface (the conventional editing environment) runs at a higher priority than the threads that support the refreshing of the rendering. This prevents the user interface from slowing down. Alternatively, time may be allocated by some other means to insure the user-interface gets adequate support to run without undue delay.

The editing environment is not substantially altered by the presence of a render region. The conventional editing tools are all available as in the conventional environment and the rendered image may fit seamlessly into the visual environment.

4) Insuring Rendering Utilizes Minimal Resources

The system may interrupt rendering whenever new scene modifications are entered, and the scene definition updated, to prevent the rendering apparatus from wasting resources on rendering of invalidated scene definition data.

The render region may be left on top of an otherwise-redundant wire-frame view or it can be placed on a single wire-frame view and hot-keyed in and out as desired. In this embodiment, the underlying rendered image is maintained, and the invocation merely paints the render region over the wire-frame view. This feature minimizes the rendering's utilization of screen- "real estate." This allows the number of pixels that must be rendered to be reduced and, thereby, the computational demands of maintaining the rendering. The resolution of the rendering can also be adjusted to reduce the computational burden of maintaining the rendering. That is, the rendering can be generated with multiple adjacent pixels, for example grouped in squares, treated as a single pixel so that the rendering has a mosaic look.

5) Features Relating to Adapting Rendering Feature to Author Needs

The render region is defined using a familiar window laid over a wire-frame. The region can be adjusted in size and position conveniently by using familiar control points for resizing and repositioning an object. The region can be rectangular or any other shape required.

According to a feature of the invention, the rendering may be restricted to selected objects or layers in the scene. Thus, the render region will show a realistic rendering over only portions of the corresponding to the objects or layers themselves, leaving other parts blank.

According to another feature of the invention, if any portions of the render region are not rendered (and assuming there is no desire to display a bitmap scene, such as a live action shot, behind the rendered region), these portions of the render region may be painted with the underlying screen showing through. So if the render region is on top of a wire-frame view, the wire-frame shows through in areas where there is no rendered object. This process may be referred to as "zero-alpha compositing," the value of zero-alpha being a pixel attribute indicating that the pixel is totally transparent.

The rendering may be displayed without requiring the author to do anything. The rendering is automatically updated and there is no need to invoke it or update it.

The authoring environment may be supplied with two parallel-updated wire-frame views of the scene. Either scene view angle or other properties may be altered and the other scene may be updated to match it. The render region may be placed over one of these wire-frame views so that the other wire-frame view always shows all control points, guides, and manipulators.

In view of the teachings of this specification, various alternative embodiments, many of which are not discussed herein, may be derived. For example, in the preferred embodiments described above, the render region is a sub-portion of a view. The region overlays and defines a part of a wire-frame view. The render region need not be defined as a separate subportion of a wire-frame view but may be contained in a separate view by itself. The rendered view maybe zoomed, panned, and rotated just as any wire-frame view. This view would preferably be visible in the editing environment without requiring any extra steps or time to invoke it. Such a rendered view could be linked to a separate wire-frame view so that when the wire-frame view is zoomed, panned, or rotated, the rendered view maintains an identical view orientation. Also, for example, the rendered image may or may not always stay in the editing environment but could be hot-keyed in or invoked in some other way at the author's prompting. In the latter context, it may be desirable to maintain the rendering in memory, and only paint it when the author requests to view the rendered image.

What is claimed is:

1. An authoring system for editing three-dimensional scenes, comprising:
    a computer with a memory and a display;
    said computer being programmed to execute a first synchronous thread effective to receive update data defining modifications to a three-dimensional scene, receive update data defining modifications to said three-dimensional scene, maintain said three-dimensional scene and maintain on said display an abstract rendering of said three-dimensional scene responsively to said update data;
    said computer being further programmed to execute a second synchronous thread, in parallel with and asynchronous with respect to, said first synchronous thread, said second synchronous thread being effective to maintain in said computer, a realistic rendering of said three-dimensional scene;
    said computer being further programmed to display continuously and automatically said realistic rendering maintained in said computer; and
    said computer being programmed to maintain an angular point of view of said realistic rendering that remains substantially identical to an angular point of view of said abstract rendering.

2. A system as in claim 1, wherein said computer is programmed to display said realistic rendering overlying a corresponding area of said abstract rendering, whereby said abstract rendering provides visual orientation information relating to said realistic rendering.

3. A system as in claim 2, wherein said computer is programmed to display a second abstract rendering substantially identical to said first abstract rendering, said first and second abstract renderings maintaining substantially identical angular orientations with respect to a camera defining a point of view characterizing a view of said abstract rendering.

4. A system as in claim 3, wherein said abstract rendering is a wire-frame rendering.

5. A system as in claim 1, wherein said first synchronous thread is further effective to receive object selection data indicating objects to be realistically rendered in said realistic rendering, said realistic rendering being maintained responsively to said object selection data.

6. A system as in claim 1, wherein said object selection data indicates objects displayed in said realistic rendering.

7. An authoring system for editing three-dimensional scenes, comprising:
    a computer with a memory and a display;
    said computer being programmed to execute a first synchronous thread effective to receive update data defining modifications to a three-dimensional scene, receive update data defining modifications to said three-dimensional scene, maintain said three-dimensional scene and maintain on said display an abstract rendering of said three-dimensional scene responsively to said update data;
    said computer being further programmed to execute a second synchronous thread, in parallel with and asynchronous with respect to, said first synchronous thread, said second synchronous thread being effective to maintain in said computer, a realistic rendering of said three-dimensional scene;
    said computer being programmed to maintain an angular point of view of said realistic rendering that remains substantially identical to angular point of view of said abstract rendering;
    said computer being programmed to display a second abstract rendering substantially identical to said first abstract rendering, said first and second abstract renderings maintaining substantially identical angular orientations with respect to a camera defining a point of view characterizing a view of said abstract rendering.

8. A system as in claim 7, wherein said computer is programmed to display said realistic rendering overlying a corresponding area of said abstract rendering, whereby said abstract rendering provides visual orientation information relating to said realistic rendering.

9. A system as in claim 7, wherein said abstract rendering is a wire-frame rendering.

10. A system as in claim 7, wherein said first synchronous thread is further effective to receive object selection data indicating objects to be realistically rendered in said realistic rendering, said realistic rendering being maintained responsively to said object selection data.

11. A system as in claim 10, wherein said object selection data indicates objects to be displayed in said realistic rendering.

12. A system as in claim 7, wherein the priorities of said first synchronous thread and said second synchronous thread are balanced in a way such that said a rate of execution of said first synchronous thread is substantially unaffected by said second synchronous thread.

13. A system as in claim 7, wherein said computer is programmed to allocate computation resources of said computer to said first and second synchronous threads such that a rate of execution of said first synchronous thread is substantially unaffected by said second synchronous thread, whereby a user-interface maintained by said first synchronous thread performs without substantial increased delay caused by the computational demands of generating said realistic rendering.

14. A system as in claim 13, wherein said computer is programmed such that said realistic rendering is displayable in a resizable region that can be adjusted to alter a number of pixels contained therein and thereby limit the computational demands of maintaining said realistic rendering.

15. A system as in claim 7, wherein said computer is programmed such that said realistic rendering is displayable in a resizable region that can be adjusted to alter a number of pixels contained therein and thereby limit the computational demands of maintaining said realistic rendering.

16. A system as in claim 7, wherein said computer is programmed to permit an adjustment of a resolution of said realistic rendering such that a computational demand of generating said realistic rendering may be adjusted.

17. A system as in claim 7, said realistic rendering is subdivided into portions, selected ones of said portions being rendered sequentially by said second synchronous thread, said selected ones being those of said portions that are determined to change appearance as a result of said update data.

18. A system as in claim 7, wherein said computer is programmed to interrupt execution of said second thread when said update data is received and to reinstate execution of said second thread after said update data becomes available to a rendering process of said second thread such that rendering of portions of said realistic rendering corresponding to portions of said scene data invalidated by said update data is prevented.

19. A system as in claim 18, wherein said realistic rendering is subdivided into portions, selected ones of said portions being rendered sequentially by said second synchronous thread, said selected ones being those of said portions that are determined to change appearance as a result of said update data.

20. A system as in claim 19, wherein said computer is programmed to blank a display of said selected ones of said portions such that said realistic rendering does not show portions rendered invalid by said update data.

21. A system as in claim 19, wherein said computer is programmed to display said selected ones of said portions such that said realistic rendering shows non-updated portions until replaced with valid portions responsively to said update data.

22. A system as in claim 7, wherein said computer is programmed to interrupt execution of said second thread only when said update data indicates a visible change in said realistic rendering.

23. An authoring system for editing three-dimensional scenes, comprising:
 a computer with a memory and a display;
 effective to receive update data defining modifications to a three-dimensional scene, receive update data defining modifications to said three-dimensional scene, maintain said three-dimensional scene and maintain on said display an abstract rendering of said three-dimensional scene responsively to said update data;
 said computer being further programmed to execute a second synchronous thread, in parallel with and asynchronous with respect to, said first synchronous thread, said second synchronous thread being effective to maintain in said computer, a realistic rendering of said three-dimensional scene;
 said computer being programmed to maintain an angular point of view of said realistic rendering that remains substantially identical to angular point of view of said abstract rendering;
 said computer being programmed to display said realistic rendering overlying a corresponding area of said abstract rendering, whereby said abstract rendering provides visual orientation information relating to said realistic rendering;
 said computer being programmed to display a second abstract rendering substantially identical to said first abstract rendering, said first and second abstract renderings maintaining substantially identical angular orientations with respect to a camera defining a point of view characterizing a view of said abstract rendering.

24. A system as in claim 23, wherein said abstract rendering is a wire-frame rendering.

25. A system as in claim 23, wherein said realistic rendering is derived by ray-tracing said three-dimensional scene.

26. A system as in claim 23, wherein said first synchronous thread is further effective to receive object selection data indicating objects to be realistically rendered in said realistic rendering, said realistic rendering being maintained responsively to said object selection data.

27. A system as in claim 23, wherein said first synchronous thread is executable at a lower priority than said second synchronous thread such that said a rate of execution of said first synchronous thread is substantially unaffected by said second synchronous thread.

28. A system as in claim 23, wherein said computer being programmed to allocate computation resources of said computer to said first and second synchronous threads such that a rate of execution of said first synchronous thread is substantially unaffected by said second synchronous thread, whereby a user-interface maintained by said first synchronous thread performs without substantial increased delay caused by the computational demands of generating said realistic rendering.

29. A system as in claim 23, wherein said computer is programmed such that said realistic rendering is displayable in a resizable region that can be adjusted to alter a number of pixels contained therein and thereby limit the computational demands of maintaining said realistic rendering.

30. A system as in claim 23, wherein said computer is programmed to permit an adjustment of a resolution of said realistic rendering such that a computational demand of generating said realistic rendering may be adjusted.

31. A system as in claim 23, wherein said realistic rendering is subdivided into portions, selected ones of said portions being rendered sequentially by said second synchronous thread, said selected ones being those of said portions that are determined to change appearance as a result of said update data.

32. A system as in claim 23, wherein said computer is programmed to interrupt execution of said second thread when said update data is received and to reinstate execution of said second thread after said update data becomes available to a rendering process of said second thread such that rendering of portions of said realistic rendering corresponding to portions of said scene data invalidated by said update data is prevented.

33. A system as in claim 32, wherein said realistic rendering is subdivided into portions, selected ones of said portions being rendered sequentially by said second synchronous thread, said selected ones being those of said portions that are determined to change appearance as a result of said update data.

34. A system as in claim 33, wherein said computer being programmed to blank a display of said selected ones of said portions such that said realistic rendering does not show portions rendered invalid by said update data.

35. A system as in claim 33, wherein said computer is programmed to display said selected ones of said portions such that said realistic rendering shows non-updated portions until replaced with valid portions responsively to said update data.

36. A system as in claim 32, wherein said computer being programmed to interrupt execution of said second thread only when said update data indicates a visible change in said realistic rendering.

37. An authoring system for editing three-dimensional scenes, comprising:

a computer with a memory and a display;

said computer being programmed to execute a first synchronous thread effective to receive update data defining modifications to a three-dimensional scene, receive update data defining modifications to said three-dimensional scene, maintain said three-dimensional scene and maintain on said display an abstract rendering of said three-dimensional scene responsively to said update data;

said computer being further programmed to execute a second synchronous thread, in parallel with and asynchronous with respect to, said first synchronous thread, said second synchronous thread being effective to maintain in said computer, a realistic rendering of said three-dimensional scene;

said first synchronous thread being executable at a lower priority than said second synchronous thread such that said a rate of execution of said first synchronous thread is substantially unaffected by said second synchronous thread; and said computer being programmed such that said realistic rendering is displayable in a resizable region that can be adjusted to alter a number of pixels contained therein and thereby limit the computational demands of maintaining said realistic rendering.

38. A system as in claim 37, wherein said computer is programmed to permit an adjustment of a resolution of said realistic rendering such that a computational demand of generating said realistic rendering may be further adjusted.

39. A system as in claim 37, wherein said realistic rendering said subdivided into portions, selected ones of said portions being rendered sequentially by said second synchronous thread, said selected ones being those of said portions that are determined to change appearance as a result of said update data.

40. A system as in claim 37, wherein said computer is programmed to interrupt execution of said second thread when said update data is received and to reinstate execution of said second thread after said update data becomes available to a rendering process of said second thread such that rendering of portions of said realistic rendering corresponding to portions of said scene data invalidated by said update data is prevented.

41. A system as in claim 40, wherein said realistic rendering is subdivided into portions, selected ones of said portions being rendered sequentially by said second synchronous thread, said selected ones being those of said portions that are determined to change appearance as a result of said update data.

42. A system as in claim 41, wherein said computer being programmed to blank a display of said selected ones of said portions such that said realistic rendering does not show portions rendered invalid by said update data.

43. A system as in claim 42, wherein said computer is programmed to display said selected ones of said portions such that said realistic rendering shows non-updated portions until replaced with valid portions responsively to said update data.

44. A system as in claim 41, wherein said computer being programmed to interrupt execution of said second thread only when said update data indicates a visible change in said realistic rendering.

45. A system as in claim 41, wherein said computer is programmed to interrupt execution of said second thread only when said update data indicates a visible change in said realistic rendering.

46. An authoring system for editing three-dimensional scenes, comprising:

a computer with a memory and a display;

said computer being programmed to execute a first synchronous thread effective to receive update data defining modifications to a three-dimensional scene, receive update data defining modifications to said three-dimensional scene, maintain said three-dimensional scene and maintain on said display an abstract rendering of said three-dimensional scene responsively to said update data;

said computer being further programmed to execute a second synchronous thread, in parallel with and asynchronous with respect to, said first synchronous thread, said second synchronous thread being effective to maintain in said computer, a realistic rendering of said three-dimensional scene; and said computer being programmed to interrupt execution of said second thread when said update data is received and to reinstate execution of said second thread after said update data becomes available to a rendering process of said second thread such that rendering of portions of said realistic rendering corresponding to portions of said scene data invalidated by said update data is prevented.

47. A system as in claim 46, wherein said computer is programmed to maintain an angular point of view of said realistic rendering that remains substantially identical to angular point of view of said abstract rendering.

48. A system as in claim 46, wherein said computer is programmed to display said realistic rendering overlying a corresponding area of said abstract rendering, whereby said abstract rendering provides visual orientation information relating to said realistic rendering.

49. A system as in claim 46, wherein said computer is programmed to display a second abstract rendering substantially identical to said first abstract rendering, said first and second abstract renderings maintaining substantially identical angular orientations with respect to a camera defining a point of view characterizing a view of said abstract rendering.

50. A system as in claim 49, wherein said abstract rendering being a wire-frame rendering.

51. A system as in claim 46, wherein said first synchronous thread is executable at a lower priority than said second synchronous thread such that said a rate of execution of said first synchronous thread is substantially unaffected by said second synchronous thread.

52. A system as in claim 46, wherein said computer is programmed to allocate computation resources of said computer to said first and second synchronous threads such that a rate of execution of said first synchronous thread is substantially unaffected by said second synchronous thread, whereby a user-interface maintained by said first synchronous thread performs without substantial increased delay caused by the computational demands of generating said realistic rendering.

53. A system as in claim 52, wherein said computer is programmed such that said realistic rendering is displayable in a resizable region that can be adjusted to alter a number of pixels contained therein and thereby limit the computational demands of maintaining said realistic rendering.

54. A system as in claim 46, wherein said realistic rendering is subdivided into portions, selected ones of said portions being rendered sequentially by said second synchronous thread, said selected ones being those of said portions that are determined to change appearance as a result of said update data.

55. A system as in claim 54, wherein said computer is programmed to blank a display of said selected ones of said portions such that said realistic rendering does not show portions rendered invalid by said update data.

56. A system as in claim 54, wherein said computer is programmed to display said selected ones of said portions such that said realistic rendering shows non-updated portions until replaced with valid portions responsively to said update data.

57. A system as in claim 46, wherein said computer is programmed to interrupt execution of said second thread only when said update data indicates a visible change in said realistic rendering.

58. A method of generating a user-interface for authoring a three-dimensional scene, comprising the steps of:
storing a 3D scene in a memory;
receiving edits to said 3D scene applied by a user;
updating said 3D scene responsively to said edits;
displaying a wire-frame view of said 3D scene;
simultaneous with said step of displaying a wire-frame view, also generating a rendered view of said 3D scene, said rendered view showing a result of ray-tracing said 3D scene;
maintaining an orientation of said rendered view identical to an orientation of said wire-frame view so that when said orientation of said wire-frame view is changed, said orientation of said rendered view is automatically changed in tandem.

59. A method as in claim 58, further comprising the step of continuously and automatically displaying said rendered view.

60. A method as in claim 58, further comprising:
displaying a wire-frame view;
maintaining an orientation of said wire-frame view substantially identical to said orientation of said first wire-frame view.

61. A method as in claim 59, further comprising continuously and automatically displaying said rendered view in a corresponding area and at an identical zoom level as said first wire frame view and on top of said first wire-frame view such that said wire-frame serves to orient said rendered view.

62. A method of generating a user-interface for authoring a three-dimensional scene, comprising the steps of:
storing a 3D scene in a memory;
receiving edits to said 3D scene applied by a user;
updating said 3D scene responsively to said edits;
displaying a wire-frame view of said 3D scene;
simultaneous with said step of displaying a wire-frame view, also generating a rendered view of said 3D scene;
maintaining a currency of said rendered view responsively to said edits by continuously rendering portions of said 3D scene that are visible in said rendered view in a first process parallel to a second process of said steps of receiving, updating, and displaying said wire-frame view, said first process being asynchronous with respect to said second process.

63. A method as in claim 62, wherein said step of maintaining includes controlling said first and second processes such that said second process is substantially unaffected by said first process.

64. A method as in claim 63, wherein second process is executable at a lower priority than said first process.

65. A method of generating a user-interface for authoring a three-dimensional scene, comprising the steps of:
storing a 3D scene in a memory;
receiving edits to said 3D scene applied by a user;
updating said 3D scene responsively to said edits;
displaying a first wire-frame view of said 3D scene;
simultaneous with said step of displaying a wire-frame view, also generating a rendered view of said 3D scene, said rendered view showing a result of ray-tracing said 3D scene;
continuously and automatically displaying said rendered view;
displaying a second wire-frame view;
maintaining an orientation of said second wire-frame view substantially identical to said orientation of said first wire-frame view; and
displaying said rendered view in a corresponding area and at an identical zoom level as said first wire-frame view and on top of said first wire-frame view such that said wire-frame serves to orient said rendered view.

66. A method generating an image corresponding to a 3D scene, comprising the steps of:
storing said 3D scene in a memory;
a view being defined by a position and orientation of a camera object of said 3D scene;
said view being further defined by a field of view and a magnification;
said field of view being divided into tiles, said tiles being adjacent portions of said field of view;
accepting update data specifying modifications to said 3D scene;
interrupting a rendering process responsively to said step of accepting;
said rendering process sequentially rendering tiles identified in a list of invalid tiles;
said rendering process including ray-tracing at least a portion of said 3D scene;
updating said 3D scene stored in said memory responsively to said step of accepting;
identifying tiles rendered invalid by said update data and updating said list of invalid tiles responsively thereto;
restarting said rendering process with said list updated in said step of identifying.

67. A method as in claim 66, further comprising the step of blanking a display of each of said tiles identified as invalid in said step of identifying.

68. A method as in claim 66, further comprising the step of continuously and automatically displaying a result of said rendering process.

69. A method as in claim 66, further comprising determining if a said update data would affect an appearance of any tile and skipping said step of interrupting when a result of said step of determining indicates that said update data would not affect said appearance of any tile.

70. A method generating an image corresponding to a 3D scene, comprising the steps of:

storing said 3D scene in a memory;

a view being defined by a position and orientation of a camera object of said 3D scene;

said view being further defined by a field of view and a magnification;

said field of view being divided into tiles, said tiles being adjacent portions of said field of view;

rendering said 3D scene;

accepting update data specifying modifications to said 3D scene;

determining if a said update data would affect an appearance of any tile and interrupting said step of rendering responsively to said step of accepting when a result of said step of determining indicates that said update data would affect said appearance of any tile;

said rendering step including sequentially rendering tiles identified in a list of invalid tiles;

said rendering step including ray-tracing at least a portion of said 3D scene;

identifying tiles rendered invalid by said update data and updating said list of invalid tiles responsively thereto; and restarting said step of rendering with said list updated in said step of identifying.

71. A method as in claim 70, wherein said step of accepting and said step of rendering are performed asynchronously with respect to each other.

72. A method as in claim 71, wherein said step of rendering and said step of accepting is performed at a higher priority than said step of rendering.

73. A method as in claim 70, wherein said step of rendering includes limiting a scope of objects to be rendered by restricting said rendering to objects identified in a list and restricting a number of pixels making up a result of said step of rendering according to a screen area definition entered by a user.

74. A method as in claim 73, further comprising the step of displaying a first wire-frame view of said 3D scene.

75. A method as in claim 74, further comprising the step of simultaneous with said step of displaying a wire-frame view, also displaying a rendered view of said 3D scene resulting from said step of rendering, said rendered view showing a result of ray-tracing said 3D scene.

76. A method as in claim 75, further comprising the step of continuously and automatically displaying said rendered view.

77. A method as in claim 76, further comprising the step of displaying a second wire-frame view and maintaining an orientation of said second wire-frame view substantially identical to said orientation of said first wire-frame view.

78. A method as in claim 77, wherein said step of displaying said rendered view includes displaying said rendered view in a corresponding area and at an identical zoom level as said first wire-frame view and on top of said first wire-frame view such that said wire-frame serves to orient said rendered view.

79. A method as in claim 75, wherein said step of displaying said rendered view includes displaying said rendered view in a corresponding area and at an identical zoom level as said first wire-frame view and on top of said first wire-frame view such that said wire-frame serves to orient said rendered view.

80. A method of displaying a selected partial rendering of a three-dimensional scene in a region of a display of said scene including an object, said display of said scene being an abstract rendering in portions outside said region and said display of said scene being a realistic rendering in portions within said region, said method comprising the steps of:

determining a projected area relative to said object;

dynamically defining boundary of said region responsively to a position of said object in said scene during a playing of an animation sequence.

81. A method as in claim 80, wherein said step of dynamically defining includes:

said region size being fixed;

positioning said fixed-sized region relative to said display responsively to a selected point on said object.

82. A method as in claim 81, wherein said step of dynamically defining includes defining said region such that at least a portion of said object is always maintained within said region.

83. A method as in claim 82, wherein said step of dynamically defining includes defining said region such that said region includes a margin around a projection of said object.

84. A method as in claim 81, wherein said step of dynamically defining includes defining said region such that said region includes a margin around a projection of said object.

85. A method as in claim 80, wherein said step of dynamically defining includes defining said region such that at least a portion of said object is always maintained within said region.

* * * * *